March 15, 1932.  C. A. HALL  1,849,295
GAUGE CLEANING DEVICE
Filed Jan. 4, 1929
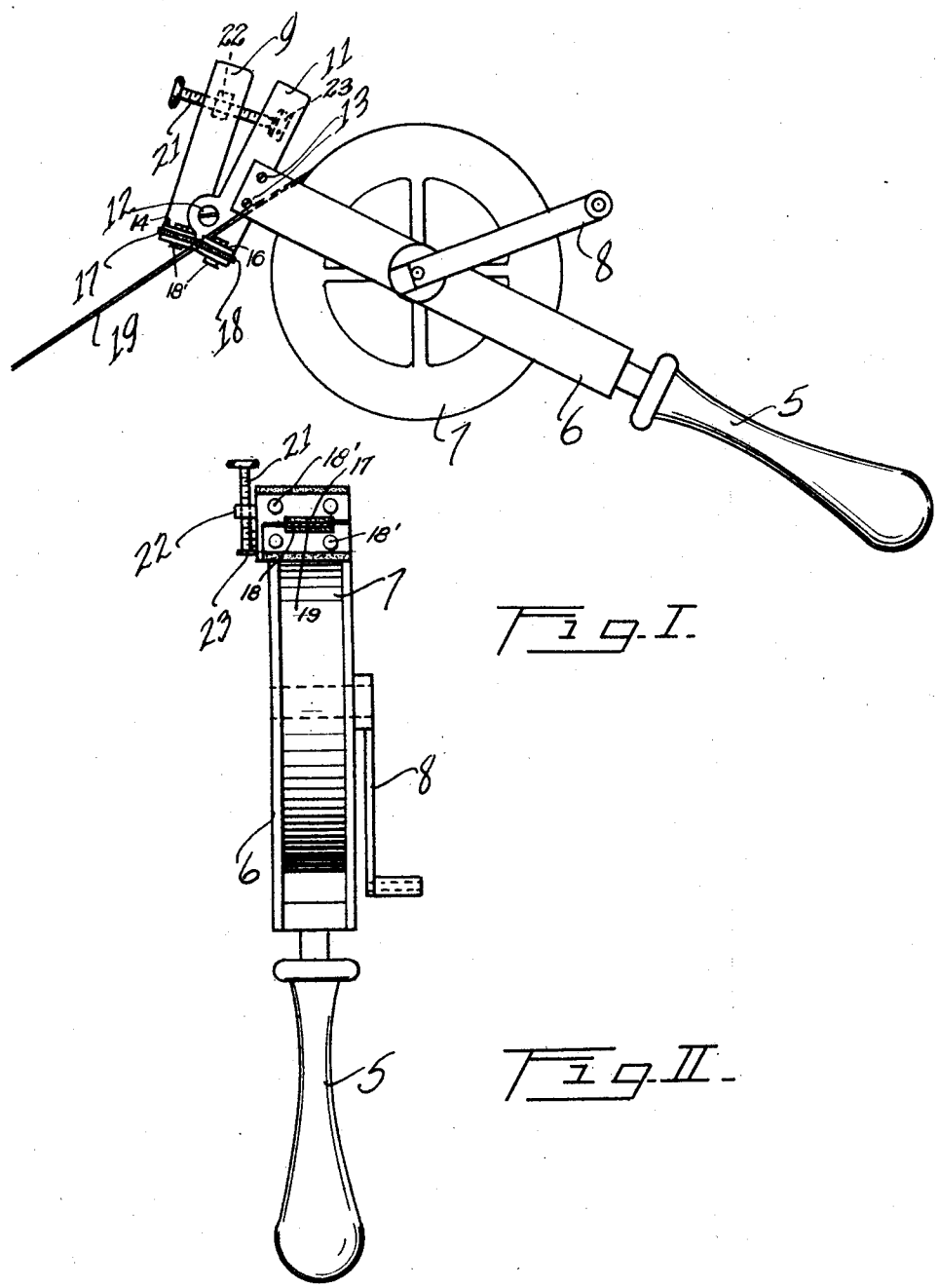
Fig. I.
Fig. II.
INVENTOR.
CONWAY A HALL
BY Victor J. Evans
ATTORNEYS.

Patented Mar. 15, 1932

1,849,295

UNITED STATES PATENT OFFICE

CONWAY A. HALL, OF HEALDSBURG, CALIFORNIA

GAUGE CLEANING DEVICE

Application filed January 4, 1929. Serial No. 330,159.

This invention relates to improvements in gauge cleaning devices.

The principal object of this invention is to provide means whereby a gauge line may be effectively cleaned after use.

A further object is to provide means whereby the operator may quickly wind in the gauge line without having to stop for cleaning as it is now necessary.

A further object is to produce a device which is simple and therefore one which may be secured to the ordinary gauge line without materially increasing the cost thereof.

A still further object is to produce a device which may be attached to an ordinary gauge line now in use.

Other objects and advantages will be apparent during the course of the following description.

In the accompanying drawings forming a part of this specification and in which like numerals are employed to designate like parts throughout the same, Figure 1 is a side elevation of a gauge line having my device applied thereto, and Figure 2 is a front elevation of the device as shown in Figure 1, with the gauge line in section.

Gauge lines are employed in various places for measuring commodities as for instance, in surveying land, taking the depth of the bilge in ships, measuring the quantity of oil in tanks, the amount of water in various sumps and other places where the commodities being measured will stick to the line and therefore must be wiped off before the line can be reeled in and stored away.

In the accompanying drawings wherein for the purpose of illustration is shown a preferred embodiment of my invention, the numeral 5 designates the customary handle gauge line, which handle carries a U-shaped fork 6 into which the reel 7 is rotatably set. The reel has a gauge line secured thereon which may be a steel tape or any other form of line which may have markings indicated thereon. A handle 8 is provided whereby the reel 7 may be rotated. The description thus far relates to an ordinary gauge line and forms no part of my invention.

My invention consists of a pair of hinged members 9 and 11 which are hingedly attached together by a screw 12, the member 11 being secured to one end of the yoke 6 as by screws 13. The members 9 and 11 have bent ends 14 and 16 respectively, which bent ends have secured thereto wiping elements 17 and 18 respectively through the instrumentality of fastening means 18', which wiping elements are preferably formed of fiber. In order to press these fiber pieces into intimate contact with the gauge line 19, I provide a screw 21 which is threadedly secured in a block 22 carried upon the side of the member 9 and has its end bearing against a shelf 23 carried upon a member 11. The result of this construction is that when the screw 21 is rotating the wiping elements will be brought into sufficient contact with the gauge line to effectively prevent any appreciable dirt being carried past the wipers and therefore wound upon the reel.

It is therefore apparent that by simply winding it upon the reel the line will be coiled thereon free from the dirt and thus eliminating the stopping and wiping with waste as is now done.

It is to be understood that the form of my invention herewith shown and described is to be taken as a preferred example of the same and that various changes relative to the material, size, shape and arrangement of parts may be resorted as do not depart from the spirit of the invention or the scope of the subjoined claim.

Having thus described my invention, I claim:—

In a gauge line wiper adapted to be secured to a gauge line holder, a pair of arms pivoted intermediate their ends having their ends bent so as to lie in a plane parallel to their pivotal connection, a wiper secured to each of said inturned ends, means for spreading the other ends of said pivoted members for the purpose of bringing said wiping elements into intimate contact with the gauge line passed therebetween.

In testimony whereof I affix my signature.

CONWAY A. HALL.